United States Patent [19]

Babitsky et al.

[11] 3,933,777
[45] Jan. 20, 1976

[54] METHOD FOR PREPARING POLYALKENAMERS

[76] Inventors: Boris Davidovich Babitsky, ulitsa Krasnogo Kursanta, 7, kv. 9; Tamara Trofimovna Denisova, ulitsa Zaitseva, 6, kv. 71; Vitaly Abramovich Kormer, ulitsa Zheleznovodskaya, 62, kv. 2; Irina Moiseevna Lapuk, Narvsky prospekt, 8, kv. 18; Mark Iosifovich Lobach, prospekt Annikova, 28, kv. 52; Nadezhda Pavlovna Simanova, ulitsa Kolomenskaya, 22, kv. 57, all of Leningrad; Kim Sergeevich Soloviev, Golovinskoe shosse, 4, kv. 17, Moscow; Tamara Yakovlevna Chepurnaya, Bulvar Novatorov, 88, kv. 39; Tatyana Lvovna Jufa, ulitsa Tipanova, 29, kv. 513, both of Leningrad, all of U.S.S.R.

[22] Filed: Mar. 11, 1974

[21] Appl. No.: 450,226

[30] Foreign Application Priority Data

Mar. 9, 1973  U.S.S.R. .............................. 1891808
Mar. 9, 1973  U.S.S.R. .............................. 1891809
Mar. 9, 1973  U.S.S.R. .............................. 1891810
Mar. 9, 1973  U.S.S.R. .............................. 1891812

[52] U.S. Cl. ..................... 260/93.1; 260/33.6 UA
[51] Int. Cl.$^2$ ..................... C08F 4/06; C08F 4/42
[58] Field of Search ................................... 260/93.1

[56] References Cited
UNITED STATES PATENTS

| 3,449,310 | 6/1969 | Dall'Asta et al. ................. 260/93.1 |
| 3,660,369 | 5/1972 | Kormer et al. .................... 260/93.1 |

*Primary Examiner*—Stanford M. Levin
*Attorney, Agent, or Firm*—Haseltine, Lake & Waters

[57] ABSTRACT

A method for the preparation of polyalkenamer which comprises in an polymerization with ring opening of the alicyclic unsaturated compound in the presence of a catalyst comprising three components:

a. a compound of a transition metal of Groups IV–VIII of the Periodic System;

b. a compound of a metal of Groups I–VI of the Periodic System; and c. quinone or its halogen derivative or an acid halide of sulfur-containing acid having the general formula $R_kSO_nQ_t$ wherein R is halogen, aryl, alkyl, nitro- or amino-group; S can be sulfur; O represents oxygen; Q stands for halogen; $k = 0\text{-}1$; $n = 1\text{-}2$; $t = 1\text{-}2$. The aforespecified component $c$ makes the catalyst more active.

2 Claims, No Drawings

METHOD FOR PREPARING POLYALKENAMERS

This invention relates to methods for the preparation of polyalkenamers which may find wide application in the synthetic rubber industry. Vulcanizates of the said polyalkenamers have good physical characteristics and elasticity and also good resistance to frost.

There is known a method of preparing polyalkenamers by polymerization with ring opening of alicyclic unsaturated compounds in the presence of a catalytic system comprising a $\tau$-allylic complex of a transition metal of Groups IV-VIII of the Periodic System having the general formula:

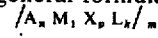

wherein:
$M_1$ is a metal of Groups IV–VIII of the Periodic System,

X can be halogen, acetate, hydroxyl, alkoxyl, cyanide, cyclopentadienyl, acetylacetonate, alkyl- and arylsulfonate group.

L represents carbonyl, cyclopentadienyl, cyclooctadiene, benzene, cycloheptatriene, cyclododecatriene, trihalogenphosphine, triphenylphosphine and triphenylphosphite, A designates a $\tau$-allylic ligand of the general formula

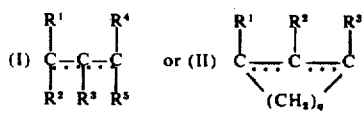

wherein
$R^1$, $R^2$, $R^3$, $R^4$, $R^5$, are hydrogen, halogen, alkyl, cycloalkyl and aryl having from 1 to 10 carbon atoms:
$n=0-4$; $p=0-3$; $k=0-6$; $m=1-2$; $q=1-9$;
taken in combination with compounds of metals of Groups I-VI of the Periodic System of the general formula

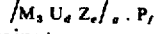

wherein:
$M_3$ is a metal of Groups I-VI of the Periodic System,
U -can be hydrogen, halogen and alkoxy-group,
Z represents halogen, aliphatic and aromatic substituent having from 1 to 18 carbon atoms;
P stands for ether or amine;
$d=0-4$; $e=0-4$; $g=1-2$; $f=0-2$
(U.S. Pat. No. 3,660,369).

A method also is known for the preparation of polyalkenamers which uses a catalyst consisting of the salt of molybdenum or tungsten having the general formula

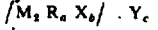

wherein:
$M_2$ is molybdenum, tungsten;
R can be halogen, aliphatic and aromatic substituent having from 1 to 10 carbon atoms;
X represents halogen, acyl- alkoxy-, aryloxy- and acetylacetonate group;
Y stands for ether or amine;
$a=0-6$; $b=0-6$; $c=0-3$;
$a+b=a$ valence of $M_2$ metal.
taken in combination with an organic compound or hydride of a metal of Groups II-III of the Periodic System in the presence of an activator which can be an oxygen-containing compound having O—O or O—H bond (U.S. Pat. No. 3,449,310).

The disadvantage of the known methods is the relatively low activity of the catalysts used.

It is the principal object of the present invention to provide a method ensuring a considerable gain in the rate of polymerization and the increased yield of polyalkenamers.

This and others objects are attained by the method which in accordance with the present invention consists in the polymerization with ring opening of alicyclic unsaturated compounds having from 4 to 5 and from 7 to 12 carbon atoms and from 1 to 4 double bonds in a ring in the presence of a catalyst comprising a. a transition metal compound of the general formula

wherein:
$M_1$ is a transition metal of Groups IV–VIII of the Periodic System;
X is a ligand selected from the group consisting of halogen, acetate, hydroxyl, alkoxyl, cyanide, cyclopentadienyl, acetylacetonate, alkyl- or arylsulfonate group;
L represents a ligand selected from the group consisting of carbonyl, cyclopentadienyl, cyclooctadiene, benzene, cycloheptatriene, cyclododecatriene, trihalogenphosphine, triphenylphosphine, triphenylphosphite;
A stands for a ligand of the general formula

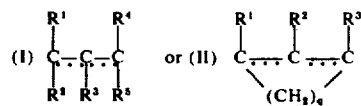

wherein
$R^1$, $R^2$, $R^3$, $R^4$, $R^5$ are hydrogen, halogen, alkyl, cycloalkyl, aryl having from 1 to 10 carbon atoms;
$n=0-4$; $p=0-3$; $k=0-6$; $m=1-2$; $q=1-9$;
or transition metal compounds of the general formula

wherein:
$M_2$ is molybdenum or tungsten;
R is halogen, aliphatic and aromatic ligand having from 1 to 10 carbon atoms;
X represents halogen, acyl-, alkoxy-, aryloxy-, and acetylacetonate group;
Y stands for ether or tertiary amine;
$a=0-6$; $b=0-6$; $c=0-3$;
$a+b=a$ valence of $M_2$ metal; b. a metal compound having the general formula

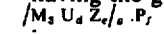

wherein:
$M_3$ is a metal of Groups I–VI of the Periodic System;
U is hydrogen, halogen, alkoxy-group;
Z represents halogen, aliphatic or aromatic radical having from 1 to 18 carbon atoms;
P stands for ether or amine;
$d=0-4$; $e=0-4$; $g=1-2$; $f=0-2$;
$d+e=a$ valence of $M_3$ metal;

c. an activator selected from ortho-benzoquinone, para-benzoquinone, naphthaquinone, anthraquinone, phenanthrenequinone, their fluoro-, chloro-, promo-, iodo-derivatives or an acid halide of sulfur-containing acid having the general formula

wherein:
R is halogen, aryl-, alkyl-, nitro- and amino-group;
S can be sulfur;
O represents oxygen;

Q stands for halogen;

$k=0$-1; $n=1$-2; $t=1$-2.

Substituents in the ring of an alicyclic compound may be alkyl-, aryl-, aralcyl-, alkaryl-, acyl-, alkoxy-group having from 1 to 10 carbon atoms and also halogen atoms. The ring of an alicyclic compound may have one or more such groups or atoms.

Polymerization may be carried out in an inert solvent such as aliphatic, alicyclic, aromatic hydrocarbon, their halogenated derivative or ether for 0,1 up to 10 hrs at a temperature of from $-50°$ to $+80°$ C.

The molar ratio of the monomer and the transition metal compound may be from 100 to 20,000.

The molar ratio of the catalyst components $a:b:c$ may be 1:/0.1–50/:/0.1–10/.

The proposed method for the preparation of polyalkenamers is realized in the following manner.

Polymerization is carried out as a continuous or batch process in reactors of conventional type which are usually used e.g. for the polymerization of butadiene or isoprene. The aforespecified components may be introduced in a solution simultaneously or one after another. The resultant polymer may be isolated from a solution by any conventional method, e.g. by precipitation with ethanol.

The above-identified catalytic systems used in the polymerization according to the proposed method are characterized by increased activity as compared to known catalysts.

The employment of quinones, their halogen derivatives and acid halides of sulfur-containing acid as an activator increases in the rate of polymerization and also the conversion of monomers.

The aforespecified activators are readily available commercial products. In use in the proposed method such activators provide reproducible results.

For a better understanding of the present invention the proposed method will now be described by way of illustration in the following examples.

EXAMPLE 1

Into a 100-ml., round-bottomed, three-necked flask are placed under argon 45 ml. of toluene, 10g of cyclopentene, $15\times10^{-5}$ mole of $WCl_6$ in 4 ml. of toluene, $15\times10^{-5}$ mole of para-benzoquinone in 2 ml. of toluene, and $6\times10^{-4}$ mole of ethylaluminium dichloride. The polymerization is carried out at a temperature of 0°C for a period of 2 hours. The polymer is obtained in a yield of 6.5 g. (65% of the theoretical amount). The polymer contains the theoretical number of double bonds; its intrinsic viscosity $/\eta/=3.5$ dl./g. (in benzene, at 25°C).

EXAMPLE 2

The polymerization is carried out as described in Example 1, except that tungsten oxytetrachloride/diisobutylaluminium chloride/tetrachloroquinone in the molar ratio of 1/1/0.25 is used as the catalyst system. Cyclooctene is used as the monomer.

After 1 hour, the polymer is obtained in a yield of 93% of the theoretical amount; its intrinsic viscosity $/\eta/=2.05$ dl./g. (in benzene, at 25°C).

EXAMPLE 3

The polymerization is carried out as described in Example 1, except that hexaphenoxytungsten/tetraethyltin/tetrafluoroquinone (the molar ratio 1/2/0.5) in a chlorobenzene solution is used as the catalyst system. Cyclobutene is used as the monomer.

After 5 minutes, the polymer is obtained in a yield of 100% of the theoretical amount; its intrinsic viscosity $/\eta/=3.2$ dl./g. (in benzene, at 25°C).

EXAMPLE 4

The polymerization is carried out as described in Example 1, except that chloroethoxytungsten pentachloride/diethylzinc/benzoquinone in a benzene solution is used as the catalyst system. As a monomer, cis, trans-cyclodecadiene -1,5 is used.

After 4 hours the polymer is obtained in a yield of 72% of the theoretical amount; its intrinsic viscosity $/\eta/=1.65$ dl./g. (in benzene, at 25°C).

EXAMPLE 5

The polymerization is carried out as described in Example 1, except that dioxo(acetylacetonate)molybdenum/diethylaluminium chloride/1.4-naphtaquinone in a cyclohexane solution is used as the catalyst system. As a monomer 3-phenylcyclooctene is used.

After 8 hours the polymer is obtained in a yield of 47% of the theoretical amount; its intrinsic viscosity $/\eta/=1.25$ dl./g. (in benzene, at 25°C).

EXAMPLE 6

The polymerization is carried out as described in Example 1, except that $MoOCl_3$.dipyridyl/$HAlCl_2$-trimethylamine/dibromoquinone (the molar ratio 1/4/1) in a heptane solution is used as the catalyst system. As a monomer 1-methylcyclooctadiene-1,5 is used.

After 3 hours the polymer is obtained 1, a yield of (the of the theoretical amount; its intrinsic viscosity/$\eta$ $/=2.2$ dl./g. (in benzene, at 25°C).

EXAMPLE 7

The polymerization is carried out as described in Example 1, except that tungsten hexachloride/butyllithium/chloranil (the molar ratio 1¾) in a toluene solution is used as the catalyst system.

The catalyst complex is prepared in the presence of the monomer, cis, trans, trans-cyclododecatriene-1,5,9. After 2 hours the polymer is obtained in a yield of 78% of the theoretical amount; its intrinsic viscosity $/\eta/=1.57$ dl./g. (in benzene, at 25°C).

EXAMPLE 8

Into a 50-l., stainless steel autoclave fitted with a stirrer and a jacket are fed 30l. of benzine, 6l. of cyclopentene, $13.5\times10^{-3}$ mole of tungsten hexachloride, $13.5\times10^{-3}$ mole of para-benzoquinone, and $54\times10^{-3}$ mole of ethylaluminium dichloride. The polymerization is carried out at a temperature of $-5°C$ for a period of 3 hours.

The polymer is obtained in a yield of 70%. The intrinsic viscosity of the polymer $/\eta/=3$ dl./g. (in benzene, at 25°C); its glass transition temperature $T_g=-102°C$.

EXAMPLE 9

Into a 100-ml., round-bottomed, three-necked flask are placed under argon 45ml. of toluene and 10g. of cyclopentene, $15\times10^{-5}$ mole of tungsten hexachloride in 4 ml. of toluene, $15\times10^{-5}$ mole of benzenesulfochloride in 2 ml. of toluene and $6\times10^{-4}$ mole of ethylaluminium dichloride in 2 ml. of toluene. The polymerization is carried out at a temperature of 0°C for a period of 0.2 hour. The polymer is obtained in a yield of 6g. (60% of the theoretical amount).

The polymer contains the theoretical amount of double bonds. The intrinsic viscosity of the polymer $/\eta/$ =2.43 dl./g. (in benzene, at 25°C).

EXAMPLE 10

The polymerization is carried out as described in Example 1, except that tungstenoxytetrachloride/diisobutylaluminium chloride/benzenesulfinylchloride in the molar ratio of 1/1/0.25 is used as the catalyst system. As a monomer cyclooctene is used. After 1 hour the polymer is obtained in a yield of 85% of the theoretical amount; its intrinsic viscosity $/\eta/$ =1.9 dl./g. (in benzene, at 25°C).

EXAMPLE 11

The polymerization is carried out as described in Example 1, except that tris(phenoxy)molybdenum chloride/H$_2$AII.diethyl ether/thionyl chloride (the molar ratio 1/2/1) in a heptane solution is used as the catalyst system. As a monomer cyclobutene is used.

After 0.5 hour the polymer is obtained in a yield of 92% of the theoretical amount; its intrinsic viscosity $/\eta/$ =2.85 dl./g. (in benzene, at 25°C).

EXAMPLE 12

The polymerization is carried out as described in Example 1, except that tungsten hexafluoride/tetraethyltin/sulfuryl chloride (the molar ratio 1/2/0.25) in a chlorobenzene solution is used as the catalyst system. As a monomer cis, trans-cyclodecadiene-1,5 is used.

After 5 hours the polymer is obtained in a yield of 65% of the theoretical amount; its intrinsic viscosity $/\eta/$ =1.95 dl./g. (in benzene, at 25°C).

EXAMPLE 13

The polymerization is carried out as described in Example 1, except that chloroethoxytungsten pentachloride/butyllithium/parabromobenzene sulfochloride (the molar ratio 1/2/0.5) in a benzene solution is used as the catalyst system. As a monomer 3-phenylcyclooctene is used.

After 10 hours the polymer is obtained in a yield of 52% of the theoretical amount; its intrinsic viscosity $/\eta/$ =1.07 dl./g. (in benzene, at 25°C).

EXAMPLE 14

The polymerization is carried out as described in Example 1, except that the combination dioxoacetylacetonate molybdenum/triethylaluminium/p-aminobenzenesulfochloride (the molar ratio 1/1/1) in a toluene solution is used as the catalyst system. As a monomer 1-methylcyclooctadiene-1,5 is used.

After 1.5 hour the polymer is obtained in a yield of 25% of the theoretical amount; its intrinsic viscosity $/\eta/$ =1.7 dl./g. (in benzene, at 25°C).

EXAMPLE 15

The polymerization is carried out as described in Example 1, except that tungsten hexachloride/diethylaluminium chloride/m-xylene-4-sulfochloride (the molar ratio 1/3/1) in a chlorobenzene solution is used as the catalyst system. As a monomer cis, trans, trans-cyclododecatriene-1,5,9 is used.

After 5 hours the polymer is obtained in a yield of 65% of the theoretical amount; its intrinsic viscosity $/\eta/$ =2.05 dl./g. (in benzene, at 25°C).

EXAMPLE 16

The polymerization is carried out as described in Example 1, except that cyclohexenesulfochloride is used as the activator. After 0.5 hour the polymer is obtained in a yield of 58% of the theoretical amount; its intrinsic viscosity $/\eta/$ =2.20 dl./g. (in benzene, at 25°C).

EXAMPLE 17

The polymerization is carried out as described in Example 1, except that propanesulfochloride is used as the activator.

After 1 hour the polymer is obtained in a yield of 62% of the theoretical amount; its intrinsic viscosity $/\eta/$ =2.02 dl./g. (in benzene, at 25°C).

EXAMPLE 18 a. Into a 100-ml., round-bottomed, three-necked flask are placed 65 ml. of benzene, $0.15 \times 10^{-3}$ mole of tetra ($\tau$-pentenyl)tungsten in 2 ml. of benzene, $0.15 \times 10^{-3}$ mole of benzoquinone in 2 ml. of benzene, $0.30 \times 10^{-3}$ mole of aluminium bromide in 1 ml. of benzene, and 10g. ($15 \times 10^{-2}$ mole) of cyclopentene.

The polymerization is carried out at temperature of 0°C for a period of 1 hour. The polymer is obtained in a yield of 8.5g. (85% of the theoretical amount). The polymer contains the theoretical amount of double bonds.

The intrinsic viscosity of the polymer $/\eta/$ =2.5 dl./g. (in benzene, at 25°C).

b. The polymerization of cyclopentene is carried out in the absence of the activator. Into a reaction flask are placed $0.375 \times 10^{-3}$ mole of tetra-($\tau$-crotyl)-tungsten, $0.75 \times 10^{-3}$ mole of aluminium bromide, 7.7 g. ($11 \times 10^{-2}$ mole) of cyclopentene. After a period of 5 hours at a temperature of 30°C the polymer is obtained in a yield of 90% (the check run).

EXAMPLE 19

The polymerization is carried out as described in Example 1, except that tetra($\tau$-allyl)zirconium/dichloroquinone/tungsten hexachloride in the molar ratio of 1/1/4 is used as the catalyst system.

After 1.5 hour the polymer is obtained in a yield of 73% of the theoretical amount; its intrinsic viscosity $/\eta/$ =1.78 dl./g. (in benzene, at 25°C).

EXAMPLE 20

The polymerization is carried out as described in Example 18, except that tetra($\tau$-methallyl)tungsten/tetraiodoquinone/diethylethoxyaluminium (the molar ratio 1/1.5/4) in a toluene solution is used as the catalyst system. As a monomer cis-cyclooctene is used. After 1 hour the polymer is obtained in a yield of 92% of the theoretical amount. Its intrinsic viscosity $/\eta/$ =3.0 dl./g. (in benzene, at 25°C).

EXAMPLE 21

The polymerization is carried out as described in Example 18, except that cyclopentadienylcobalt dicarbonyl/1,4-naphtaquinone/tungsten hexafluoride (the molar ratio 1/1/2) in a heptane solution is used as the catalyst system. After 0.5 hour the polymer is obtained in a yield of 95% of the theoretical amount; its intrinsic viscosity $/\eta/$ =4.2 dl./g. (in benzene, at 25°C).

EXAMPLE 22

The polymerization is carried out as described in Example 18, except that cyclopentadienyltantalum tetracarbonyl/triethylaluminium/chloranil (the molar ratio 1/0.5/4) in a toluene solution is used as the catalyst system. As a monomer 1-methylcyclooctadiene-1,5 is used. After 5,5 hours the polymer is obtained in a yield of 40% of the theoretical amount; its intrinsic viscosity $/\eta/$ =1,47 dl./g. (in benzene, at 25°C).

EXAMPLE 23

The polymerization is carried out as described in Example 18, except that $Re_2(CO)_{10}$/o-benzoquinone/tetraphenyltin (the molar ratio 1/1/3) in a benzene solution is used as the catalyst system. As a monomer cis, trans, trans-cyclododecatriene-1,5,9 is used. After 5 hours the polymer is obtained in a yield of 56% of the theoretical amount; its intrinsic viscosity $/\eta/$ =1,27 dl./g. (in benzene, at 25°C).

EXAMPLE 24

The polymerization is carried out as described in Example 18, except that bis($\tau$-allyl)nickel/phenyltungsten pentachloride/2,5-dibromoquinone (the molar ratio 1/4/1,5) in a cyclohexane solution is used as the catalyst system. As a monomer 3-phenylcyclooctene is used. After 4 hours the polymer is obtained in a yield of 51% of the theoretical amount; its intrinsic viscosity $/\eta/$ =1,38 dl./g. (in benzene, at 25°C).

EXAMPLE 25

The polymerization is carried out as described in Example 18, except that tris($\tau$-crotyl)tungsten chloride/benzoquinone/a complex of chloralan with trimethylamine (the molar ratio 1/1/2) in a chlorobenzene solution is used as the catalyst system. As a monomer cis, trans-cyclodecadiene-1,5 is used. After 6 hours the polymer is obtained in a yield of 73% of the theoretical amount; its intrinsic viscosity $/\eta/$ =1,85 dl./g. (in benzene, at 25°C).

EXAMPLE 26 a. Into a 100-ml., round-bottomed, three-necked flask are placed 65 ml. of benzene, $0.15 \times 10^{-3}$ mole of tetra ($\tau$-methallyl)tungsten in 2 ml. of benzene, $0.15 \times 10^{-3}$ mole of thionyl chloride in 2 ml. of benzene, $0.6 \times 10^{-3}$ mole of aluminium bromide in 1 ml. of benzene and 1 og. ($15 \times 10^{-2}$ mole) of cyclopentene. The polymerization is carried out at a temperature of 0°C for a period of 0.5 hour. The polymer is obtained in a yield of 8.7 g (87% of the theoretical amount). The polymer contains the theoretical amount of double bonds; its intrinsic viscosity $/\eta/$ =2,3 dl./g. (in benzene, at 25°C).

b. The polymerization of cyclopentene is carried out in the absence of the activator, the monomer to $\tau$-complex ratio being 300/1. After a period of 5 hours at a temperature of 30°C the polymer is obtained in a yield of 90% (the check run).

EXAMPLE 27

The polymerization is carried out as described in Example 26, except that tetra($\tau$-allyl)zirconium/benzenesulfochloride/tungsten hexachloride in the ratio of 1/1/4 is used as the catalyst system. After 0.2 hour the polymer is obtained in a yield of 75% of the theoretical amount; its intrinsic viscosity $/\eta/$=1,80 dl./g. (in benzene, at 25°C).

EXAMPLE 28

The polymerization is carried out as described in Example 26, except that tetra ($\tau$-pentenyl)tungsten/benzenesulfinyl chloride/diethylethoxy aluminium (the molar ratio:1/1,5/4) in a toluene solution is used as the catalyst system. As a monomer cis-cylooctene is used. After 1 hour the polymer is obtained in a yield of 90% of the theoretical amount; its intrinsic viscosity $/\eta/$=3,o dl./g. (in benzene, at 25°C).

EXAMPLE 29

The polymerization is carried out as described in Example 26, except that cyclopentadienylcobalt dicarbonyl/sulfuryl chloride/tungsten hexafluoride (the molar ratio 1/1/2) in a heptane solution is used as the catalyst system. As a monomer cyclobutene is used. After 0.5 hour the polymer is obtained in a yield of 95% of the theoretical amount; its intrinsic viscosity $/\eta/$=4.5 dl./g. (in benzene, at 25°C).

EXAMPLE 30

The polymerization is carried out as described in Example 26, except that cyclopentadienyltantalum tetracarbonyl/parabromobenzenesulfochloride/ethylaluminium dichloride (the molar ratio 1/1.5/4) in a chlorobenzene solution is used as the catalyst system. As a monomer cyclooctadiene-1,5 is used. After 1.5 hour the polymer is obtained in a yield of 73% of the theoretical amount; its intrinsic viscosity $/\eta/$=1.85 dl./g. (in benzene, at 25°C).

EXAMPLE 31

The polymerization is carried out as described in Example 26, except that dirhenium decacarbonyl/paraaminobenzenesulfochloride/phenyltungsten pentachloride (the molar ratio 1/0.5/2) in a toluene solution is used as the catalyst system. As a monomer cyclopentene is used. After 2 hours the polymer is obtained in a yield of 50% of the theoretical amount; its intrinsic viscosity $/\eta/$=1.75 dl./g. (in benzene, at 25°C).

EXAMPLE 32

The polymerization is carried out as described in Example 26, except that tris($\tau$-allyl)tungsten chloride/thionyl chloride /a complex of chloralan with trimethylamine (the molar ratio 1/1/4) in a cyclohexane solution is used as the catalyst system. As a monomer cis, trans, trans-cyclododecatriene-1,5,9 is used. After 1 hour the polymer is obtained in a yield of 80% of the theoretical amount; its intrinsic viscosity $/\eta/$=1,2 dl./g. (in benzene, at 25°C).

We claim:

1. A method for the preparation of a polyalkenamer by homopolymerization comprising subjecting an alicyclic unsaturated compound having from 4 to 5 and 7 to 12 carbon atoms and from 1 to 4 double bonds in the ring to polymerization with ring opening in the presence of a catalyst consisting of three components: a) a compound selected from the group of a transition metal compound comprising $\tau$-complexes of transition metals having the general formula $$/A_nM_1X_pL_k/_m$$

wherein:

$M_1$ is a transition metal selected from groups IV–VIII of the Periodic System;

X is a ligand selected from the group consisting of halogen, acetate, alkoxyl, cyanide, cyclopentadienyl, acetylacetonate, alkyl- and arylsulfonate group;

L represents a ligand selected from the group consisting of carbonyl, cyclopentadienyl, cyclooctadiene, benzene, cycloheptatriene, cyclododecatriene, trihalogenphosphine, triphenylphosphine, triphenylphosphite;

A stands for a ligand selected from $\tau$-allylic ligands having the general formula

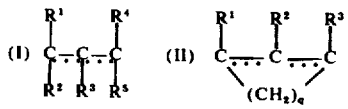

wherein:
$R^1, R^2, R^3, R^4, R^5$ are ligands selected from the group consisting of hydrogen, halogen, alkyl, cyanoalkyl and aryl having from 1 to 10 carbon atoms;
$n = 0\text{-}4$; $p = 0\text{-}3$; $k = 0\text{-}6$; $m = 1\text{-}2$; $q = 1\text{-}9$;
and transition metal compounds of the general formula
$/M_2 R_a X_b / Y_c$
wherein:
$M_2$ is molybdenum or tungsten;
R is a ligand selected from a group consisting of halogen, aliphatic and aromatic substituent having from 1 to 10 carbon atoms;
X represents a ligand selected from a group consisting of halogen, acyl, alkoxy-, aryloxy- and acetylacetonate groups;
Y stands for a ligand selected from the group comprising ether and amine;
$a = 0\text{-}6$; $b = 0\text{-}6$; $c = 0\text{-}3$;
$a + b = a$ valence of $M_2$ metal;

b. a compound of a metal selected from Groups I–VI of the Periodic System having the general formula
$/M_3 U_d Z_e/_g P_f$
wherein:
$M_3$ is a metal selected from Groups I–VI of the Periodic System;
U is a ligand selected from the group consisting of hydrogen, halogen and alkoxy-group;
Z represents a ligand selected from the group consisting of halogen, aliphatic and aromatic ligands having from 1 to 18 carbon atoms;
P stands for a ligand selected from the group comprising ether and amine;
$d = 0\text{-}4$; $e = 0\text{-}4$; $g = 1\text{-}2$; $f = 0\text{-}2$; and c. an activator selected from the group consisting of quinones, halogenated quinones and an acid halide of sulfur-containing acid having the general formula
$/R_k SO_n Q_t/$
wherein:
R is a ligand selected from the group consisting of halogen, alkyl, aryl, nitro- and amino-group;
Q is a ligand selected from the group of halogens;
S represents sulfur;
O stands for oxygen;
$k = 0\text{-}1$; $n = 1\text{-}2$; $t = 1\text{-}2$; wherein the molar ratio of the catalyst components $a:b:c$ is $1:0.1\text{-}50:0.1\text{-}10$, and the molar ratio of the monomer to the transition metal compound is within the limits $100\text{-}20,000:1$.

2. A method according to claim 1 wherein the polymerization process is carried out in an inert solvent selected from the group consisting of hydrocarbons, halogenated hydrocarbons and ethers.

* * * * *